C. E. SMITH.
TYPE WRITER CENTERING SCALE.
APPLICATION FILED JULY 13, 1912.
1,152,923. Patented Sept. 7, 1915.
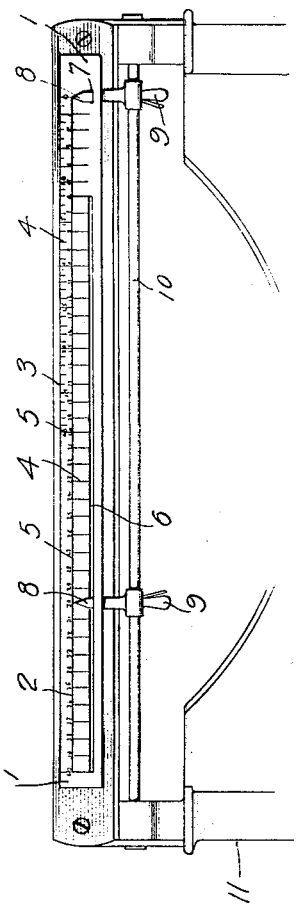
WITNESSES
L. H. Schmidt
John Scott
INVENTOR
CHARLES E. SMITH,
BY
T. J. J. Brandenburg
ATTORNEYS

UNITED STATES PATENT OFFICE.

CHARLES E. SMITH, OF NEW YORK, N. Y., ASSIGNOR TO UNDERWOOD TYPEWRITER COMPANY, OF NEW YORK, N. Y., A CORPORATION OF DELAWARE.

TYPE-WRITER CENTERING-SCALE.

1,152,923.     Specification of Letters Patent.     Patented Sept. 7, 1915.

Application filed July 13, 1912. Serial No. 709,128.

*To all whom it may concern:*

Be it known that I, CHARLES E. SMITH, a subject of the King of England, residing at New York city, in the county of New York and State of New York, have invented new and useful Improvements in Type-Writer Centering-Scales, of which the following is a specification.

My invention relates to centering scales for typewriting machines, and the prime object is to provide a device of this nature by which may be easily and instantaneously ascertained the center of any line of writing for which the typewriter margin-stops may be adjusted.

A subsidiary object is to provide a device of this character which shall be exceedingly simple of construction and easy to manipulate and understand.

Another object is to provide a device, such as indicated, which may be correlated with a typewriting machine, such as the Underwood, without reorganizing the parts of the typewriting machine, and which may be readily attached to or removed from the machine.

Another object is to provide a device of the character referred to, which may be manufactured and sold at a nominal cost, and which will thereby not add appreciably to the regular cost of the typewriting machine.

Another object is to provide such a device which, by reason of its simplicity of structure and the material of which it is made, shall present the maximum of lightness, consistent with reasonable durability in use.

Other objects of advantage and improvement may appear as the specification proceeds, and the nature of the invention more fully appears.

With these objects in view, the invention comprehends, in its broadest aspect, a new and improved device, susceptible of manufacture and sale as a separate article of manufacture, distinct from the typewriting machine itself, for determining easily and quickly, the center of any line of writing, irrespective of the particular position of adjustment of the movable margin-stops of the typewriter. As a development of this idea, the invention comprehends, also, the provision of means operatively associated and correlated with the margin-stops of a typewriting machine, for quickly and easily ascertaining the center of any line of writing for which the margin-stops may be adjusted.

It may be explained that, if the margin-stops of a typewriting machine are set at the ends of the typewriter scale, it is easy enough to determine the center of the line of writing, because all the operator has to do is to halve the scale. But, if one stop is set at, say, 10, and the other at, say, 25, some mathematical calculation or computation is necessary to determine the center of the line of writing, corresponding to this setting or adjustment of the stops. My invention is designed to eliminate the necessity of this laborious calculation.

In the accompanying drawings, showing an embodiment of my invention capable of carrying out the underlying principles thereof, the figure is a view, in front elevation, of the scale centering device attached to a typewriting machine.

The centering scale device 1 may be made of any suitable material, preferably, from the standpoint of comparative lightness and cheapness, as, for example, celluloid, aluminum, tin, cardboard, or other appropriate material. Also, the device may be made of transparent material.

The scale device 1 is, preferably, a relatively narrow strip, having on one face of said strip, and running longitudinally thereof, two parallel scales 2 and 3, each commencing at zero, at one end thereof and running in the same direction. If desired, both faces of said strip, (though not so shown), may be provided with these double scales, so that when the scale marks on one face of the strip become blurred or indistinct from constant use, the strip may be reversed to bring the other face of the centering scale into view of the typist. Each scale 2 and 3 comprises a series of marks or graduations 4, and numerical indices 5, and the distance between adjacent marks on the scale 2 preferably corresponds to a letter-space movement of the typewriter carriage. The two scales 2 and 3 are characterized by the fact that, while both have the same number of graduations or marks 4, the distance between adjacent graduations or marks on the scale 2 is twice that between adjacent graduations or marks on the scale 3. While I have shown forty graduations in each scale, this is merely illustratory, as any number of graduations may be used, provided the same number of graduations is used in each scale and the space between each two adjacent graduations of one scale, and between each two adjacent graduations of the other scale, is in the ratio of two to one.

The device 1 may be formed with suitable or appropriate means for connecting it with the typewriting machine. For example, the device 1 may be provided with a longitudinal slot 6 extending from near one end thereof and terminating, preferably, on the other side of the center of said device 1. The device 1 is also provided, near the end opposite the slotted end of said device, with a perforation 7. In said slot 6 works the pointer 8 of the left-hand marginal stop 9 (of well-known construction) and, projecting through the aperture 7, is the pointer 8 of the right-hand marginal stop 9 (of well-known construction), both said stops being, as usual, slidable on the rod 10 of the typewriter frame 11. The function of the slot 6 is to permit longitudinal reciprocation of the device 1 by simply moving the right-hand stop 9 on the rod 10, without disturbing the left-hand marginal stop 9. The perforation 7 is (as shown in the drawing) directly beneath the zero point of both scales 2 and 3.

The operation is as follows: In the position of the parts as shown, the left-hand marginal stop has been adjusted so that its pointer 8 points to the numeral index 30 on the scale 2. This same number 30 on the scale 3 is at the central point of the line of writing for which said marginal stops 9, 9 have been set. Move the typewriter carriage until the carriage pointer is opposite, that is, in line with, said number 30 on the scale 3, then back space half the length of the word to be written (assuming that it is a word which the operator desires to centralize on the line of writing for which the marginal stops 9, 9 have been set). If desired, one of the scales 2 or 3 may be a different color from the other, the more easily to distinguish the two scales. From the above description, it will be seen that my invention provides a simple means for quickly ascertaining the center of a heading, no matter where the marginal stops are set.

Variations may be resorted to within the scope of the invention, and portions of the improvements may be used without others.

Having thus described my invention, what I claim as new and desire to secure by Letters Patent of the United States is:

1. A centering-device, for use in connection with typewriters employing movable margin-stops, comprising means provided with two scales, each scale comprising a series of graduations, the space between each two adjacent graduations of one scale being twice that between each two adjacent graduations of the other scale, said centering-device being also provided with a perforation toward one end thereof and with a longitudinally-extending slot, for attachment of the centering-device to the typewriter margin stops.

2. In a typewriter, the combination with movable margin-stops, of a centering-device carried by one of said margin-stops, and comprising means provided with two scales, each scale comprising a series of graduations, the space between each two adjacent graduations of one scale being twice that between each two adjacent graduations of the other scale.

3. In a typewriter, the combination with movable margin-stops, of a centering-device detachably carried by one of said margin-stops, and comprising means provided with two scales, each scale comprising a series of graduations, the space between each two adjacent graduations of one scale being twice that between each two adjacent graduations of the other scale.

4. In a typewriter, the combination with movable margin-stops, of a centering-device carried by one of said margin-stops and movable independently of one of said margin-stops, and comprising means provided with two scales, each scale comprising a series of graduations, the space between each two adjacent graduations of one scale being twice that between each two adjacent graduations of the other scale.

5. In a typewriter, the combination with movable margin-stops, of a centering-device comprising slotted means provided with two scales, one of said margin-stops engaging said slot, each scale comprising a series of graduations, the space between each two adjacent graduations of one scale being twice that between each two adjacent graduations of the other scale.

6. In a typewriter, the combination with movable margin-stops, of a centering-device comprising slotted means provided with two scales, one of said margin stops engaging said slot, each scale comprising a series of graduations, the space between each two adjacent graduations of one scale being twice that between each two adjacent graduations of the other scale, said centering-device having an aperture engaged by the other margin stop.

7. In a typewriting machine, the combination with a scale, of two margin stops having members projecting through the scale.

8. In a typewriting machine, the combination with a scale plate having two scales thereon, of two margin stops having members projecting through the scale plate, the distance between adjacent graduations on one scale being a fractional part of the distance between adjacent graduations on the other scale.

9. In a typewriting machine, the combination of a scale device having two scales thereon, and two margin stops having members projecting through said device.

10. In a typewriting machine, the combination with adjustable margin stops, of a centering device connected to one of said stops to be shifted thereby when said stop is adjusted and comprising two scales, each consisting of numbered graduations, the graduations of one scale being at letter-space distances apart, and the adjacent graduations of the other scale being one-half a letter-space distance apart, whereby the distance between any two numbers on the last-named scale is equal to half the distance between the same numbers on the other scale.

In testimony whereof I have hereunto set my hand in presence of two subscribing witnesses.

CHARLES E. SMITH.

Witnesses:
GEORGE A. MEINECKE,
WILLIAM H. BRACY.